(No Model.)
G. ARMS.
HOSE OR TUBING.
No. 308,729. Patented Dec. 2, 1884.
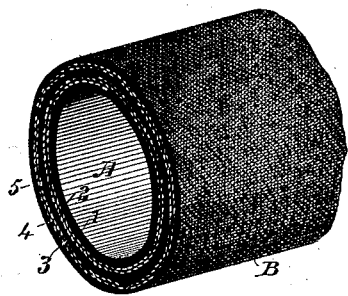
Attest.
Geo. T. Smallwood.
Philip Mauro
Inventor:
George Arms
By A. Pollok
his Atty.

UNITED STATES PATENT OFFICE.

GEORGE ARMS, OF NEW YORK, N. Y., ASSIGNOR TO THE NEW YORK BELTING AND PACKING COMPANY, OF SAME PLACE.

HOSE OR TUBING.

SPECIFICATION forming part of Letters Patent No. 308,729, dated December 2, 1884.

Application filed October 13, 1884. (No model.)

*To all whom it may concern:*

Be it known that I, GEORGE ARMS, of New York city, in the county and State of New York, have invented a new and useful Improvement in Rubber Hose or Tubing, which improvement is fully set forth in the following specification.

The invention has reference more particularly to flexible rubber hose for use on railroad-cars as part of the air-brakes, and also in other circumstances where it is much exposed to handling, especially by greasy hands. The object is to protect the exterior rubber sheath from injury, as well as to facilitate handling.

To this end the invention consists in providing the hose or tubing made up of one or more thicknesses or tubular layers of fibrous fabric inclosed between tubes of soft vulcanized rubber, constituting the impervious lining and impervious cover, with a fibrous envelope or jacket of yarn or thread, knitted or woven, or knitted and woven upon the hose or tube after it has been vulcanized.

The accompanying drawing represents in section and perspective a section or short length of the hose constructed in accordance with the invention.

A is the rubber hose or tubing, composed of several thicknesses or tubular layers of fibrous fabric inclosed between tubes of soft or vulcanized rubber. B is the protecting-envelope formed, as shown, of thread or yarn (usually of cotton or linen) knit closely about the hose. After the hose has been put together and vulcanized (in any ordinary or suitable way) it is placed in a knitting or weaving and knitting machine, and the fibrous envelope knit (or woven and knit) tightly about it.

The hose shown embodies an improvement for which I have made application for Letters Patent of even date herewith. It has an impervious inner tube, 1; a layer, 2, composed of two windings of rubber-coated fabric; an intermediate impervious rubber tube, 3; a second layer, 4, of fibrous fabric, and an impervious rubber cover, 5.

The protecting-envelope B could be applied to hose not embodying that improvement.

I claim—

The hose or tubing of one or more thicknesses or tubular layers of fibrous fabric, inclosed between tubes of vulcanized rubber, provided with a separable but close-fitting fibrous envelope of knit thread or yarn, or its specified equivalent, substantially as described.

In testimony whereof I have signed this specification this 10th day of October, 1884.

GEO. ARMS.

In presence of—
C. J. HEDRICK,
PHILIP MAURO.